United States Patent
Tsai et al.

(10) Patent No.: US 10,869,323 B2
(45) Date of Patent: Dec. 15, 2020

(54) WIRELESS LOCAL AREA NETWORK AND BLUETOOTH DEVICE

(71) Applicant: REALTEK SEMICONDUCTOR CORPORATION, Hsinchu (TW)

(72) Inventors: Chih-Hung Tsai, Kaohsiung (TW); Chien-Yu Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 78 days.

(21) Appl. No.: 16/231,715

(22) Filed: Dec. 24, 2018

(65) Prior Publication Data

US 2019/0208531 A1 Jul. 4, 2019

(30) Foreign Application Priority Data

Jan. 2, 2018 (TW) .................. 107100083

(51) Int. Cl.
*H04W 72/12* (2009.01)
*H04W 40/24* (2009.01)
(Continued)

(52) U.S. Cl.
CPC ......... *H04W 72/1215* (2013.01); *H04W 4/80* (2018.02); *H04W 40/244* (2013.01);
(Continued)

(58) Field of Classification Search
CPC . H04W 72/1215; H04W 4/80; H04W 40/244; H04W 56/003; H04W 72/0446; H04W 84/12
See application file for complete search history.

(56) References Cited

U.S. PATENT DOCUMENTS 8,442,016 B1 * 5/2013 Lee .................. H04W 16/14
370/338
9,426,832 B2 8/2016 Park et al.
(Continued)

FOREIGN PATENT DOCUMENTS

EP 3085190 B1 10/2017
WO WO2012/044329 A1 4/2012

OTHER PUBLICATIONS

OA letter of counterpart TW application(appl. No. 107100083) Summary of the TW OA letter: Claims 1, 3, 5-6, 8, 10 are rejeacted as being unpatentable over the cited references 1-3. Claims 2, 9 are rejeacted as being unpatentable over the cited references 1-4. Claims 4, 7 are rejected as being unpatentable over the cited references 1-3, 5.

*Primary Examiner* — Donald L Mills
(74) *Attorney, Agent, or Firm* — WPAT, PC (57) ABSTRACT

The present invention discloses a Wireless Local Area Network (WLAN) and Bluetooth (BT) device including a WLAN circuit and a BT circuit. The WLAN circuit starts a WLAN slot according to a beacon of a beacon signal from an access point and executes WLAN communication. The WLAN slot ends after a measured reception time point of the beacon so as to prevent missing the beacon. The BT circuit starts a BT slot after the end of the WLAN slot and executes BT communication. If the BT slot is shorter than the period of the beacon signal minus the WLAN slot, the WLAN circuit earns additional time to start an extended WLAN slot after the end of the BT slot for carrying on the WLAN communication. The extended WLAN slot is not longer than the period of the beacon signal minus the sum of the WLAN and BT slots.

8 Claims, 5 Drawing Sheets

(51) Int. Cl.
*H04W 56/00* (2009.01)
*H04W 4/80* (2018.01)
*H04W 72/04* (2009.01)
*H04W 84/12* (2009.01)

(52) U.S. Cl.
CPC ..... *H04W 56/003* (2013.01); *H04W 72/0446* (2013.01); *H04W 84/12* (2013.01)

(56) References Cited

U.S. PATENT DOCUMENTS

| | | |
|---|---|---|
| 9,436,842 B2 | 9/2016 | Purohit |
| 2002/0136233 A1* | 9/2002 | Chen ................. H04W 72/1215 370/445 |
| 2003/0125019 A1* | 7/2003 | Bajikar ............. H04W 72/1215 455/420 |
| 2004/0242159 A1* | 12/2004 | Calderon ............... H04W 16/14 455/63.3 |
| 2005/0215284 A1* | 9/2005 | Su ..................... H04W 72/1215 455/556.2 |
| 2006/0292987 A1 | 12/2006 | Ophir et al. |
| 2008/0049758 A1* | 2/2008 | Hong ...................... H04L 12/66 370/395.4 |
| 2009/0063740 A1 | 3/2009 | Yeh et al. |
| 2009/0137206 A1* | 5/2009 | Sherman ............... H04W 16/14 455/41.2 |
| 2010/0284380 A1* | 11/2010 | Banerjee ............... H04W 16/14 370/338 |
| 2012/0033645 A1* | 2/2012 | Mantravadi ......... H04W 72/044 370/336 |
| 2016/0066274 A1* | 3/2016 | Pujari ............. H04W 52/0216 370/311 |
| 2019/0174418 A1* | 6/2019 | Kencharla ............ H04W 76/18 |

* cited by examiner

WIRELESS LOCAL AREA NETWORK AND BLUETOOTH DEVICE

BACKGROUND OF THE INVENTION

1. Field of the Invention

The present invention relates to a wireless communication device, especially to a Wireless Local Area Network and Bluetooth device.

2. Description of Related Art

In recent years, the current trend is toward integrating a wireless local area network (WLAN) circuit (e.g., a circuit in compliance with IEEE 802.11 standard) and a Bluetooth (BT) circuit into one integrated circuit. However, both a WLAN circuit (e.g., a circuit in compliance with IEEE 802.11b/g/n standard) and a BT circuit use the 2.4 GHZ Industrial Scientific Medical band (ISM band) for operation, and thus the WLAN circuit and the BT circuit integrated into one integrated circuit will encounter the problem of mutual interference.

A BT circuit is characterized by using Advanced Audio Distribution Profile (A2DP). A BT circuit can transmit audio signals to a BT audio device (e.g., a BT earphone, a BT speaker, . . . ) by A2DP. When a BT circuit transmits audio signals (e.g., music signals) to a BT audio device by A2DP, if a WLAN circuit carries out transmission simultaneously, in a circumstance that the mutual interference of the two circuits is not well controlled, the BT audio device may play the music with staccato while the WLAN circuit may encounter problems such as the transmission speed slowing down and the wireless link being disconnected.

Figure 1:
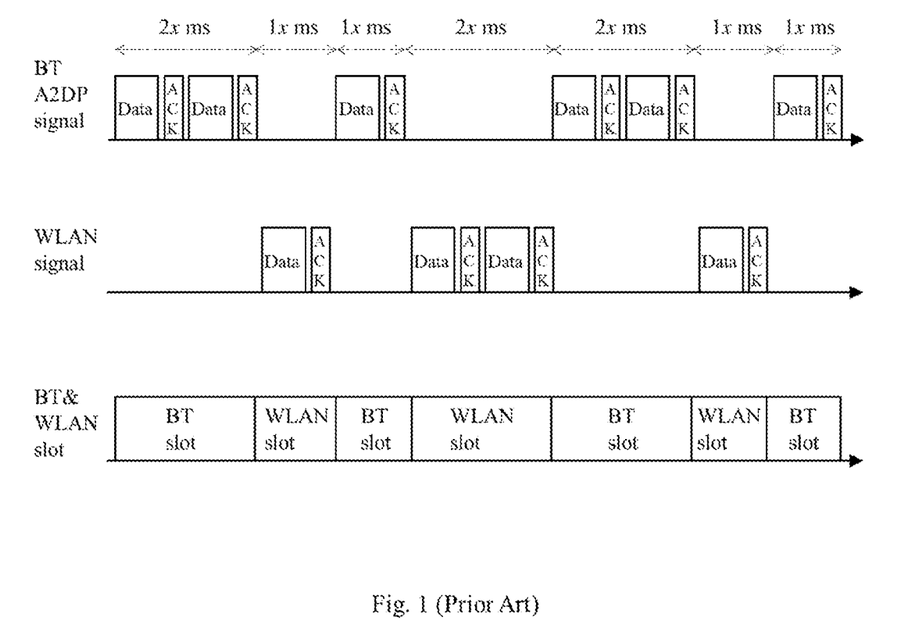
FIG. 1 shows the distribution of WLAN slots and BT slots of the prior art.

FIG. 1 shows the distribution of slots for the WLAN transmission and the BT A2DP transmission concurrently sharing the 2.4 GHZ frequency band, in which each label "Data" stands for a data packet and each label "ACK" stands for an acknowledgement. In consideration of the limited size of a data buffer in a general BT audio device, a BT circuit usually transmits A2DP audio packets to the BT audio device in an intermittent manner while each time section for the packet transmission usually consumes 1x~2x ("x" is a digit between 0 and 9) milliseconds (ms). The BT audio device will transmit a flow control packet (e.g., packets named "STOP", "GO", . . . ) to control the flow of audio signals from the BT circuit, and the WLAN circuit will transmit data during the intervals in which the BT circuit stops transmitting the A2DP audio packets. Therefore, the coexistence of the BT transmission and the WLAN transmission is realized.

However, the manner of distributing WLAN slots and BT slots based on A2DP audio packets has at least the following problems.

(1) The WLAN slots are scattered. Although in theory a WLAN circuit can transmit a control packet (e.g., a packet such as Null/Null-P/QOS-Null/CTS-To-Self defined by IEEE 802.11 standard) to have the packets transmitted by a WLAN access point (AP) stay in a WLAN slot, in practice some AP can not stop transmitting packets to the WLAN circuit in time and therefore transmits the packets to the WLAN circuit during a BT slot, which leads to the interference with the BT transmission and causes some BT packets to be retransmitted. In addition, providing WLAN slots are overly scattered, some AP can not transmit packets right after it received a transmission allowance notification from a WLAN circuit (i.e., right after a BT slot ends and a WLAN slot begins) and thus a part of the WLAN slot is wasted and the throughput of the WLAN circuit drops.

(2) The link between a WLAN circuit and an AP may be disconnected for the WLAN circuit receiving no beacons from the AP. Since the period (e.g., 100 ms) of the AP sending beacons is unrelated to the conventional slot distribution (as shown in FIG. 1), the beacons from the AP may fall within BT slots continuously and thus the WLAN circuit may stop the connection with the AP for receiving no beacons in WLAN slots for a long time.

SUMMARY OF THE INVENTION

In view of the problems of the prior arts, an object of the present invention is to provide a Wireless Local Area Network and Bluetooth (WLAN&BT) device being an improvement over the prior arts.

An embodiment of the WLAN&BT device of the present invention includes a WLAN circuit and a BT circuit. The WLAN circuit is configured to establish a wireless connection between the WLAN&BT device and an access point, and configured to receive a beacon signal from the access point to maintain the wireless connection, wherein the beacon signal includes a plurality of beacons. The WLAN circuit includes a WLAN transceiver and a WLAN controller. The WLAN transceiver is configured to anticipate the time point to receive every coming beacon of the beacon signal according to a known reception time point of a received beacon of the beacon signal and the period of the beacon signal, and configured to transmit an interruption signal to the WLAN controller and start a WLAN slot before the WLAN transceiver receives a current beacon of the beacon signal, in which the WLAN slot finishes after a measured reception time point of the current beacon so as to prevent missing the current beacon. The WLAN controller is configured to transmit a setting signal to the WLAN transceiver according to the interruption signal so as to have the WLAN transceiver carry out WLAN communication in the WLAN slot according to the setting signal. The BT circuit is configured to establish a BT connection between the WLAN&BT device and a BT device. The BT circuit includes a BT transceiver and a BT controller. The BT transceiver is configured to start a BT slot for execution of BT communication after the WLAN slot finishes, in which the BT slot is not longer than the period of the beacon signal minus the WLAN slot. The BT controller is configured to stop the BT slot according to a BT slot upper limit and/or a transmission notification from the BT transceiver, in which if the BT slot is shorter than the period of the beacon signal minus the WLAN slot, the BT controller is operable to inform the WLAN controller of this matter so as to have the WLAN controller allow the WLAN transceiver to start an extended WLAN slot for execution of the WLAN communication. The above-mentioned extended WLAN slot is not longer than the period of the beacon signal minus the sum of the WLAN slot and the BT slot.

Another embodiment of the WLAN&BT device of the present invention includes a WLAN circuit and a BT circuit. The WLAN circuit is configured to start a WLAN slot for execution of WLAN communication according to a beacon of a beacon signal from an access point, in which the WLAN slot ends after a measured reception time point of the beacon so as to prevent missing the beacon. The BT circuit is configured to start a BT slot for execution of BT communication after the WLAN slot ends, in which the BT slot is not longer than the period of the beacon signal minus the WLAN slot. Furthermore, if the BT slot is shorter than the period of the beacon signal minus the WLAN slot, the WLAN circuit is configured to start an extended WLAN slot for the execution of the WLAN communication after the BT slot ends, and the extended WLAN slot is not longer than the period of the beacon signal minus the sum of the WLAN slot and the BT slot.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present invention discloses a Wireless Local Area Network and Bluetooth (WLAN&BT) device capable of securely receiving beacons from a wireless local area network (WLAN) access point (AP) to prevent the interruption of WLAN connection and increasing the flexibility of slot distribution.

Figure 2:
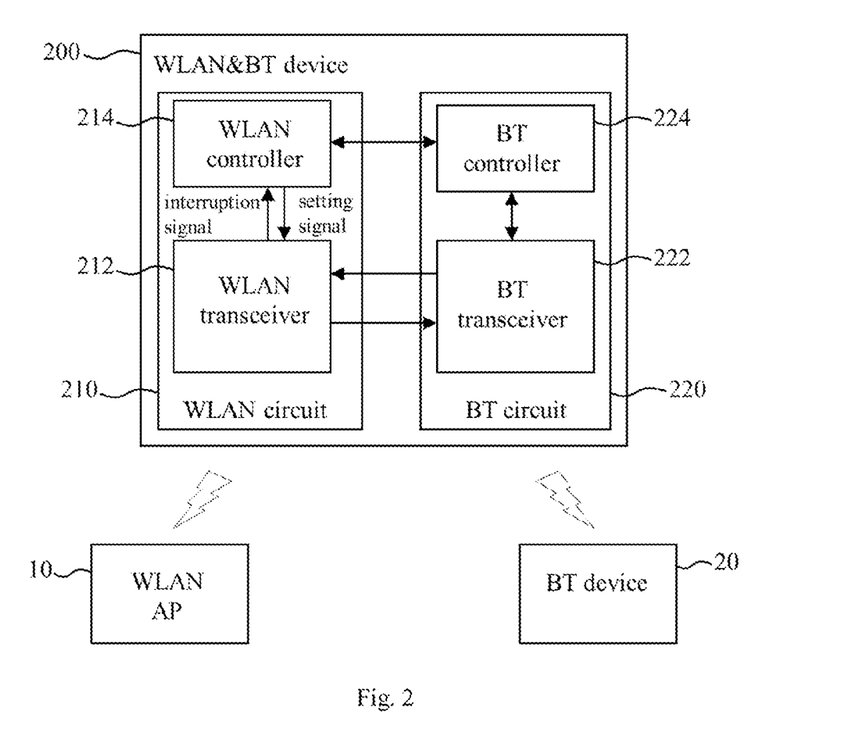
FIG. 2 shows an embodiment of the WLAN&BT device of the present invention.

FIG. 2 shows an embodiment of the WLAN&BT device of the present invention. The WLAN&BT device 200 in FIG. 2 includes a WLAN circuit 210 and a Bluetooth (BT) circuit 220. The WLAN circuit 210 and the BT circuit 220 are integrated into one integrated circuit (not shown in FIG. 2), packaged in a semiconductor package (not shown in FIG. 2), set on a circuit board (not shown in FIG. 2) or set in a range where mutual interference of the WLAN circuit 210 and the BT circuit 220 is non-negligible. The WLAN circuit 210 is configured to establish a wireless connection (as indicated by the lightning symbol in FIG. 2) between the WLAN&BT device 200 and a WLAN access point (AP) 10, and configured to receive a beacon signal from the AP 10 for the maintenance of the wireless connection. The beacon signal is a periodic signal including a plurality of beacons; in other words, the period of the beacon signal (i.e., beacon interval) is equal to an interval between the beginning of a current beacon and the beginning of a next beacon. Once the WLAN circuit 210 establishes the wireless connection with the AP 10, the WLAN circuit 210 learns about a known reception time point of a received beacon of the beacon signal and learns about the period of the beacon signal (e.g., 100 milliseconds); therefore, the WLAN circuit 210 can anticipate the time point to receive every coming beacon of the beacon signal. The BT circuit 220 is configured to establish a BT connection (as indicated by the lightning symbol in FIG. 2) between the WLAN&BT device 200 and a BT device 20; for instance, the BT circuit 220 is configured to establish the BT connection between the WLAN&BT device 200 and the BT device 20 (e.g., a BT audio device) by Advanced Audio Distribution Profile (A2DP). The WLAN circuit 210 and the BT circuit 220 operate concurrently in a manner of Time Division Multiple Access (TDMA) and can optionally exchange operation information.

Figure 3:
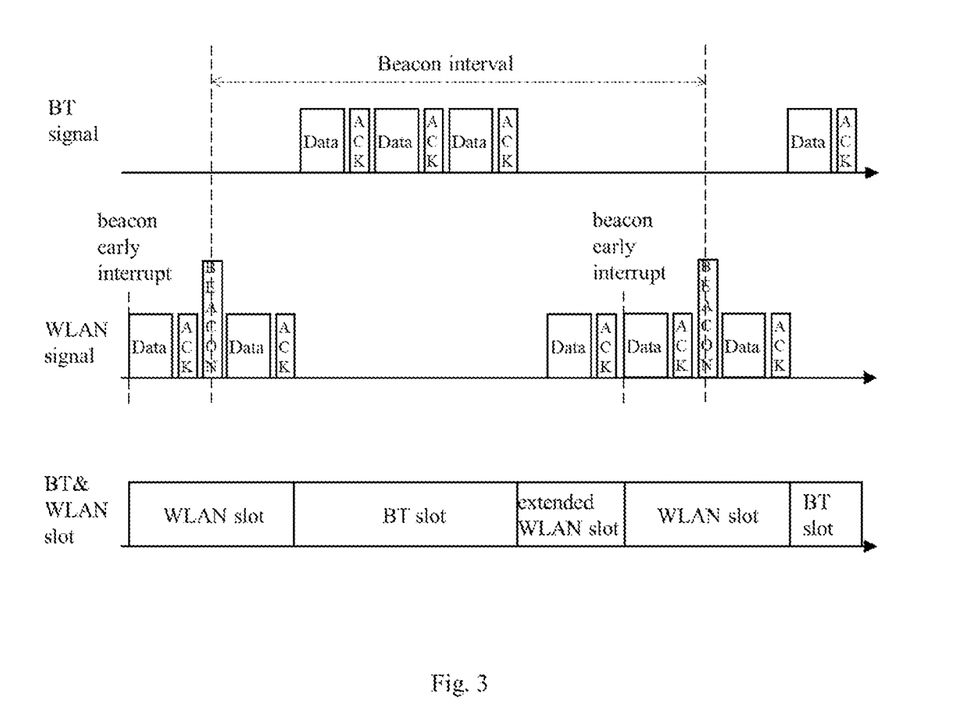
FIG. 3 shows the distribution of WLAN slots and BT slots according to an embodiment of the present invention.

FIG. 3 shows the distribution of WLAN slots and BT slots according to an embodiment of the present invention, in which each label "Data" stands for a data packet (or a control packet, or a well-defined signal), each label "ACK" stands for an acknowledgement, each label "beacon early interrupt" stands for an interruption signal, each label "BEACON" stands for a beacon, each label "WLAN slot" stands for a WLAN slot, each label "BT slot" stands for a BT slot and each label "extended WLAN slot" stands for an extended WLAN slot. The amount and the length of each of the signals Data, ACK, Beacon, etc. in FIG. 3 are just exemplary for understanding, not limitations in the implementation of the present invention.

Please refer FIG. 2 and FIG. 3. The WLAN circuit 210 includes a WLAN transceiver 212 and a WLAN controller 214. The WLAN transceiver 212 is configured to anticipate the time point to receive every coming beacon of the beacon signal according to the aforementioned known reception time point and the period of the beacon signal, and configured to transmit an interruption signal to the WLAN controller 214 and start a WLAN slot before the reception of a coming beacon of the beacon signal; in light of the requirement of an implementation (e.g., an implementation with/without an extended WLAN slot), the WLAN transceiver 212 can transmit the interruption signal before the reception of every coming beacon of the beacon signal. The WLAN slot begins before the reception of a coming beacon and ends after a measured reception time point of the same beacon so as to ensure that the WLAN transceiver 212 can securely receive this beacon. For instance, the beginning of a WLAN slot is earlier than a measured reception time point of a coming beacon for a beacon-variation tolerance time (e.g., a few milliseconds or more) (i.e., a time difference between the beginning of the WLAN slot and the measured reception time point of the beacon is not shorter the beacon-variation tolerance time), and the end of the same WLAN slot is later than the measured reception time point of the beacon for the beacon-variation tolerance time (i.e., a time difference between the end of the WLAN slot and the measured reception time point of the beacon is not shorter the beacon-variation tolerance time); therefore the beacon will be received by the WLAN transceiver 212 during the WLAN slot theoretically. The beginning of the WLAN slot is substantially or approximately equal to the time point of the interruption signal being transmitted.

Figure 4:
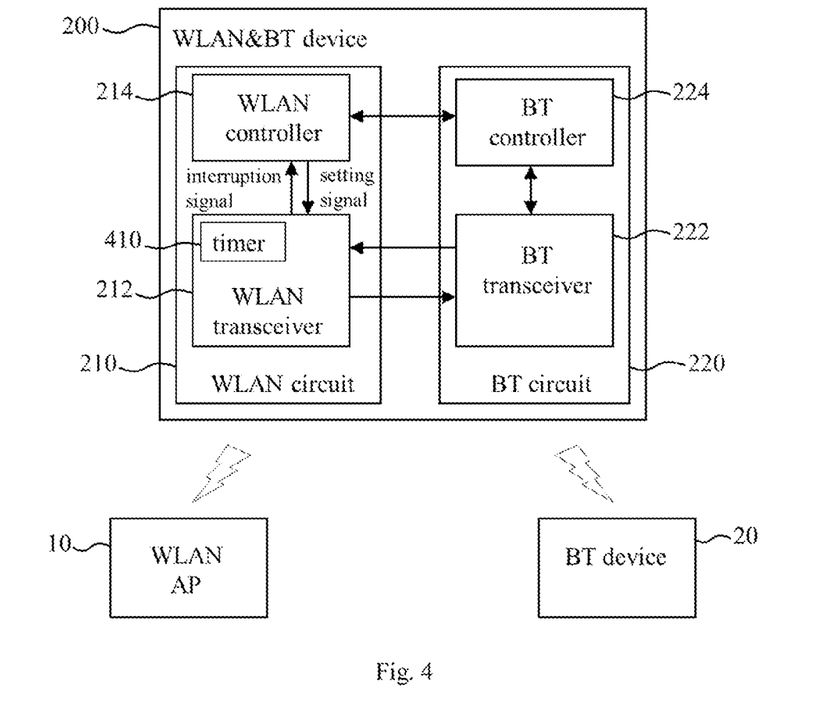
FIG. 4 shows an embodiment of the WLAN transceiver of FIG. 2.

Please refer to FIG. 4. The WLAN transceiver 212 can use at least a timer 410 to provide the measured reception time point of every coming beacon of the beacon signal and provide the beacon-variation tolerance time. Since the timer 410 can be a known or self-developed circuit, its detail is omitted here.

Please refer to FIG. 2 and FIG. 3. The WLAN controller 214 is configured to carry out a WLAN software and/or a WLAN firmware and thereby transmit a setting signal to the WLAN transceiver 212 according to the interruption signal so as to have the WLAN transceiver 212 carry out WLAN communication in a WLAN slot. An exemplary implementation of the setting signal is for determining a value of the below-mentioned WLAN transceiver control signal (GNT_WL) and a value of the below-mentioned BT transceiver control signal (GNT_BT).

Please refer to FIG. 2 and FIG. 3. The BT circuit 220 includes a BT transceiver 222 and a BT controller 224. The BT transceiver 222 is configured to start a BT slot for the execution of BT communication after the end of a previous WLAN slot. The BT slot is not longer than one period of the beacon signal minus a WLAN slot while the BT slot and the WLAN slot are in the period; in other words, the sum of the WLAN slot and the BT slot is not longer than the period of the beacon signal. The BT controller 224 is configured to carry out a BT software and/or a BT firmware and thereby finish a BT slot according to a BT slot upper limit (e.g., one period of the beacon signal minus a WLAN slot while the BT slot and the WLAN slot are in the period) and/or a transmission notification from the BT transceiver 222 (e.g., a notification indicating no BT packets in a queue or indicating a transmission-stop signal of the aforementioned BT audio device). If the BT slot is equal to the period of the beacon signal minus the WLAN slot, the BT slot ends before or at the time point the WLAN transceiver 212 transmitting a next interruption signal; if the BT slot is shorter than the period of the beacon signal minus the WLAN slot, the BT controller 224 is operable to transmit a BT slot termination notification to the WLAN controller 214 before or at the time point the BT slot being stopped so that the WLAN controller 214 can allow the WLAN transceiver 212 to start an extended WLAN slot for the execution of the WLAN communication. The extended WLAN slot is not longer than the period of the beacon signal minus the sum of the WLAN slot and the BT slot; in other words, the sum of the WLAN slot, the BT slot and the extended WLAN slot is not longer than the period of the beacon signal.

In an exemplary implementation, if a BT slot is equal to one period of the beacon signal minus a WLAN slot while the BT slot and the WLAN slot are in the period, the sum of the WLAN slot and the BT slot is equal to the period of the beacon signal; if the BT slot is shorter than the period of the beacon signal minus the WLAN slot, the sum of the WLAN slot, the BT slot and an extended WLAN slot in the same period is equal to the period of the beacon signal. It should be noted that if the BT slot is shorter than the period of the beacon signal minus the WLAN slot, the WLAN controller 214 is operable to transmit the aforementioned setting signal to the WLAN transceiver according to the BT slot termination notification from the BT controller so as to have the WLAN transceiver 212 carry out the WLAN communication according to the setting signal during the extended WLAN slot; furthermore, if a next WLAN slot follows the extended WLAN slot, the WLAN transceiver 212 can choose not to send a next interruption signal.

It should be noted that the WLAN transceiver 212 can further include or electrically connect with at least one WLAN transceiver circuit (e.g., a media access control circuit, a physical layer circuit, a radio-frequency circuit, . . . ), and the BT transceiver 222 can further include or electrically connect with at least one BT transceiver circuit (e.g., a control circuit, a physical circuit, a radio-frequency circuit, . . . ). Since the WLAN transceiver circuit and the BT transceiver circuit can be implemented with known or self-developed circuits, their detail is omitted here. It should also be noted that people of ordinary skill in the art can implement the WLAN controller 214 and the BT controller 224 with at least one of a known or self-developed micro control unit (MCU), a known or self-developed digital signal processor (DSP), the combination of logic components, etc. in accordance with the disclosure of the present invention.

Figure 5:
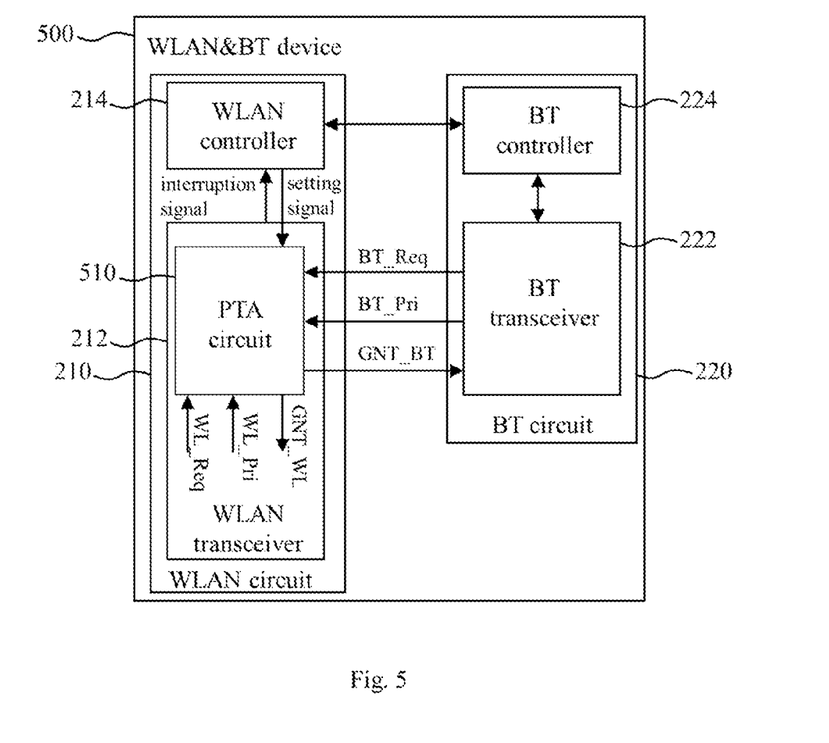
FIG. 5 shows another embodiment of the WLAN&BT device of the present invention.

FIG. 5 shows another embodiment of the WLAN&BT device of the present invention. In comparison with the embodiment of FIG. 2, the WLAN&BT device 500 of FIG. 5 further includes a packet traffic arbitration (PTA) circuit 510. In this embodiment, the PTA circuit 510 is included in the WLAN transceiver 212; however, the PTA circuit 510 could be an independent circuit or included in another circuit. The PTA circuit 510 is configured to generate a WLAN transceiver control signal (GNT_WL) and a BT transceiver control signal (GNT_BT) according to a part or all of the following signals: the aforementioned setting signal of the WLAN controller 214; at least one communication request (WL_Req) of the WLAN transceiver 212 (e.g., a WLAN transmission request and/or a WLAN reception request generated by the aforementioned WLAN transceiver circuit); at least one communication priority value (WL_Pri) of the WLAN transceiver 212 (e.g., a WLAN transmission request priority value and/or a WLAN reception request priority value generated by the aforementioned WLAN transceiver circuit); at least one communication request (BT_Req) of the BT transceiver 222 (e.g., a BT transmission request and/or a BT reception request generated by the aforementioned BT transceiver circuit); and at least one communication priority value (BT_Pri) of the BT transceiver 222 (e.g., a BT transmission request priority value and/or a BT reception request priority value generated by the aforementioned BT transceiver circuit). The WLAN transceiver control signal is for allowing (when GNT_WL=1) or forbidding (when GNT_WL=0) the WLAN transceiver 212 to execute the WLAN communication; the BT transceiver control signal is for allowing (when GNT_BT=1) or forbidding (when GNT_BT=0) the BT transceiver 222 to execute the BT communication.

In an exemplary implementation, the PTA circuit 510 determines the content of an arbitration table according to the setting signal of the WLAN controller 214 or chooses an arbitration table from a plurality of predetermined arbitration tables, then selects a setting value from the arbitration table according to the signals WL_Req, WL_Pri, BT_Req and BT_Pri, and then generates the WLAN transceiver control signal (GNT_WL) and the BT transceiver control signal (GNT_BT) according to the setting value. In another exemplary implementation, the PTA circuit 510 uses a first arbitration table favorable for WLAN communication in a WLAN slot and thereby controls the communication of the WLAN circuit 210 and the communication of the BT circuit 220 in the WLAN slot according to the first arbitration table, in which the priority of the WLAN communication is higher than the priority of the BT communication under the first arbitration table; and the PTA circuit 510 uses a second arbitration table favorable for BT communication in a BT slot and thereby controls the communication of the WLAN circuit 210 and the communication of the BT circuit 220 in the BT slot according to the second arbitration table, in which the priority of the BT communication is higher than the priority of the WLAN communication under the second arbitration table. An exemplary implementation of each of the aforementioned arbitration tables is shown in Table 1, in which each digit "1" stands for an asserted request or a high priority value, each digit "0" stands for a de-asserted request or a low priority value, each setting value "00" stands for GNT_WL=0 and GNT_BT=0, each setting value "01" stands for GNT_WL=1 and GNT_BT=0, each setting value "10" stands for GNT_WL=0 and GNT_BT=1, and each setting value "11" stands for GNT_WL=1 and GNT_BT=1 (while the setting value "11" could be adopted when the WLAN&BT device 500 executes communication by a WLAN antenna and a BT antenna).

TABLE 1

| WL_Req | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| WL_Pri | 0 | 0 | 0 | 0 | 1 | 1 | 1 | 1 | 0 | 0 | 0 | 0 | 1 | 1 | 1 | 1 |
| BT_Req | 0 | 0 | 1 | 1 | 0 | 0 | 1 | 1 | 0 | 0 | 1 | 1 | 0 | 0 | 1 | 1 |
| BT_Pri | 0 | 1 | 0 | 1 | 0 | 1 | 0 | 1 | 0 | 1 | 0 | 1 | 0 | 1 | 0 | 1 |
| setting value, in which "/" indicates "or" | 00 | 00 | 10 | 10 | 00 | 00 | 10 | 10 | 01 | 01 | 01/10/11 | 10/11 | 01 | 01 | 01/11 | 11/10/01 |

In an exemplary implementation, the PTA circuit 510 is configured to generate an antenna switch signal for selecting at least one of several antennas (e.g., a WLAN antenna and a BT antenna) according to some or all of the following signals: the setting signal of the WLAN controller 214; WL_Req; WL_Pri; BT_Req; and BT_Pri. For instance, the PTA circuit 510 can generate the antenna switch signal by using a setting table similar to Table 1. The setting table includes a plurality of setting values, in which the first setting value (e.g., the setting value "01" in Table 1) stands for choosing a first antenna (e.g., a WLAN antenna), a second setting value (e.g., the setting value "10" in Table 1) stands for choosing a second antenna (e.g., a BT antenna), and a third setting value (e.g., the setting value "11" in Table 1) stands for choosing the first antenna and the second antenna. It should be noted that when the WLAN&BT device 500 merely uses a single antenna for communication, the above-mentioned antenna switch signal is no longer necessary; and when the WLAN&BT device 500 uses a plurality of antennas for communication, the antenna switch signal is useful for choosing at least one of the antennas.

Please refer to FIG. 2 and FIG. 3. In order to prevent the AP 10 from transmitting a data packet to the WLAN circuit 210 during a BT slot and thereby prevent causing the BT communication interference, the WLAN circuit 210 can be configured to transmit a control packet (e.g., a packet such as Null/Null-P/QoS-Null/CTS-To-Sef defined by IEEE 802.11 standard) before the end of a WLAN slot so as to inform the AP 10 of the WLAN circuit 210 going to enter a predetermined mode (e.g., a low power mode), and can be configured to transmit another control packet at the beginning of a WLAN slot or at the beginning of an extended WLAN slot so as to inform the AP 10 of the WLAN circuit 210 leaving the predetermined mode. The above-mentioned control packets are optional and not limitations in the implementation of the present invention. It should be noted that the WLAN circuit 210 can optionally cancel the transmission of the control packet(s); for instance, if the environment where the WLAN circuit 210 stays is noisy, the transmission of the control packet(s) may have negative effect on the throughput of the WLAN circuit 210, and thus the WLAN circuit 210 should cancel the transmission of the control packet(s). In addition, even though the control packet(s) is/are transmitted, the WLAN circuit 210 can optionally choose not to enter the predetermined mode.

To sum up, the WLAN&BT device of the present invention treats a beacon signal of a WLAN AP as a reference and distributes WLAN slots and BT slots according to the reference. Therefore, the WLAN&BT device can securely receive the beacons from the WLAN AP and prevent the WLAN connection with the WLAN AP from being disconnected.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A Wireless Local Area Network and Bluetooth (WLAN&BT) device, comprising:

a wireless local area network (WLAN) circuit configured to establish a wireless connection between the WLAN&BT device and an access point, and configured to receive a beacon signal from the access point to maintain the wireless connection, wherein the beacon signal includes a plurality of beacons and the WLAN circuit includes:

a WLAN transceiver configured to anticipate a time point to receive every coming beacon of the beacon signal according to a known reception time point of a received beacon of the beacon signal and a period of the beacon signal, and configured to transmit an interruption signal to a WLAN controller and start a WLAN slot before the WLAN transceiver receives a current beacon of the beacon signal, the WLAN slot being finished after a measured reception time point of the current beacon, wherein the WLAN controller is configured to transmit a setting signal to the WLAN transceiver according to the interruption signal so as to have the WLAN transceiver carry out WLAN communication in the WLAN slot according to the setting signal; and a Bluetooth (BT) circuit configured to establish a BT connection between the WLAN&BT device and a BT device, wherein the BT circuit includes:

a BT transceiver configured to start a BT slot for execution of BT communication after the WLAN slot finishes, in which the BT slot is not longer than the period of the beacon signal minus the WLAN slot; and a BT controller configured to stop the BT slot according to a BT slot upper limit and/or a transmission notification of the BT transceiver, in which when the BT slot is shorter than the period of the beacon signal minus the WLAN slot, the BT controller is configured to inform the WLAN controller so as to have the WLAN controller allow the WLAN transceiver to start an extended WLAN slot for execution of the WLAN communication, wherein the extended WLAN slot is not longer than the period of the beacon signal minus a sum of the WLAN slot and the BT slot.

2. The WLAN&BT device of claim 1, wherein the WLAN transceiver includes a packet traffic arbitration (PTA) circuit configured to generate a WLAN transceiver control signal and a BT transceiver control signal according to the setting signal, at least one communication request of the WLAN transceiver, at least one communication priority value of the WLAN transceiver, at least one communication request of the BT transceiver and at least one communication priority value of the BT transceiver, in which the WLAN transceiver control signal is for allowing or forbidding the WLAN transceiver to carry out the WLAN communication and the BT transceiver control signal is for allowing or forbidding the BT transceiver to carry out the BT communication.

3. The WLAN&BT device of claim 1, wherein the WLAN circuit is configured to transmit a control packet before an end of the WLAN slot so as to inform the access point about the WLAN circuit going to enter a predetermined mode and thereby prevent the access point from transmitting a data packet to the WLAN circuit during the BT slot.

4. The WLAN&BT device of claim 1, wherein the BT slot upper limit is equal to the period of the beacon signal minus the WLAN slot.

5. The WLAN&BT device of claim 1, wherein the transmission notification is for indicating no BT packets in a queue or indicating a transmission-stop signal from the BT device.

6. The WLAN&BT device of claim 1, wherein a beginning of the WLAN slot is earlier than the measured reception time point of the current beacon for a beacon-variation tolerance time and an end of the WLAN slot is later than the measured reception time point of the current beacon for the beacon-variation tolerance time.

7. The WLAN&BT device of claim 1, wherein when the BT slot is equal to the period of the beacon signal minus the WLAN slot, the sum of the WLAN slot and the BT slot is equal to the period of the beacon signal; and when the BT slot is shorter than the period of the beacon signal minus the WLAN slot, a sum of the WLAN slot, the BT slot and the extended WLAN slot is equal to the period of the beacon signal.

8. The WLAN&BT device of claim 1, wherein the beacon signal is a periodic signal.

\* \* \* \* \*